H. C. KITTELSON.
PLOW RAISING MECHANISM.
APPLICATION FILED JAN. 26, 1917.

1,278,939.

Patented Sept. 17, 1918.
3 SHEETS—SHEET 1.

Witnesses
H. Woodard

Inventor
H. C. Kittelson
By
Attorneys

H. C. KITTELSON.
PLOW RAISING MECHANISM.
APPLICATION FILED JAN. 26, 1917.
1,278,939.
Patented Sept. 17, 1918.
3 SHEETS—SHEET 2.
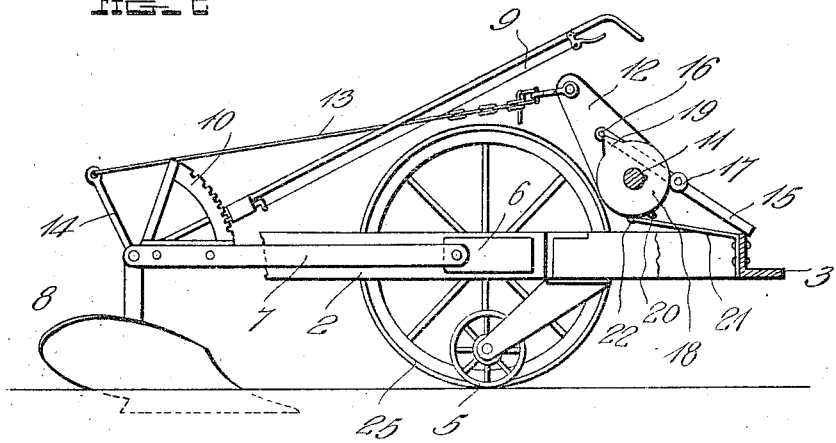
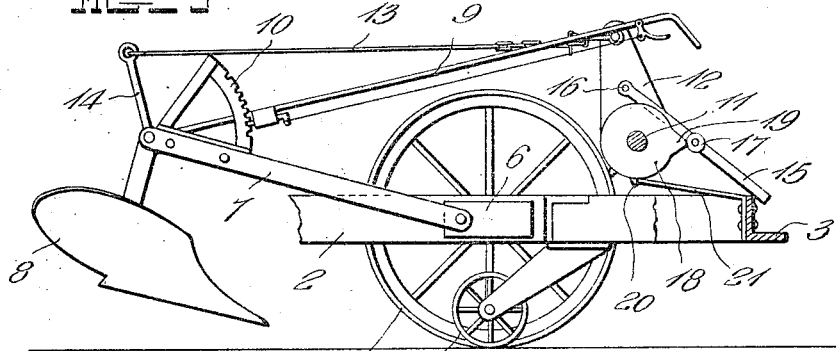
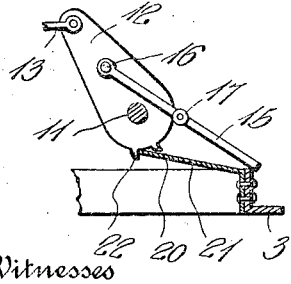
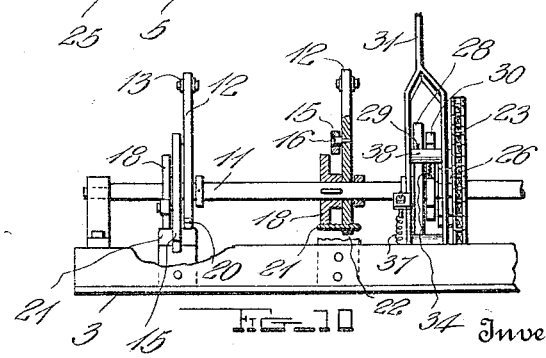
Inventor
H. C. Kittelson

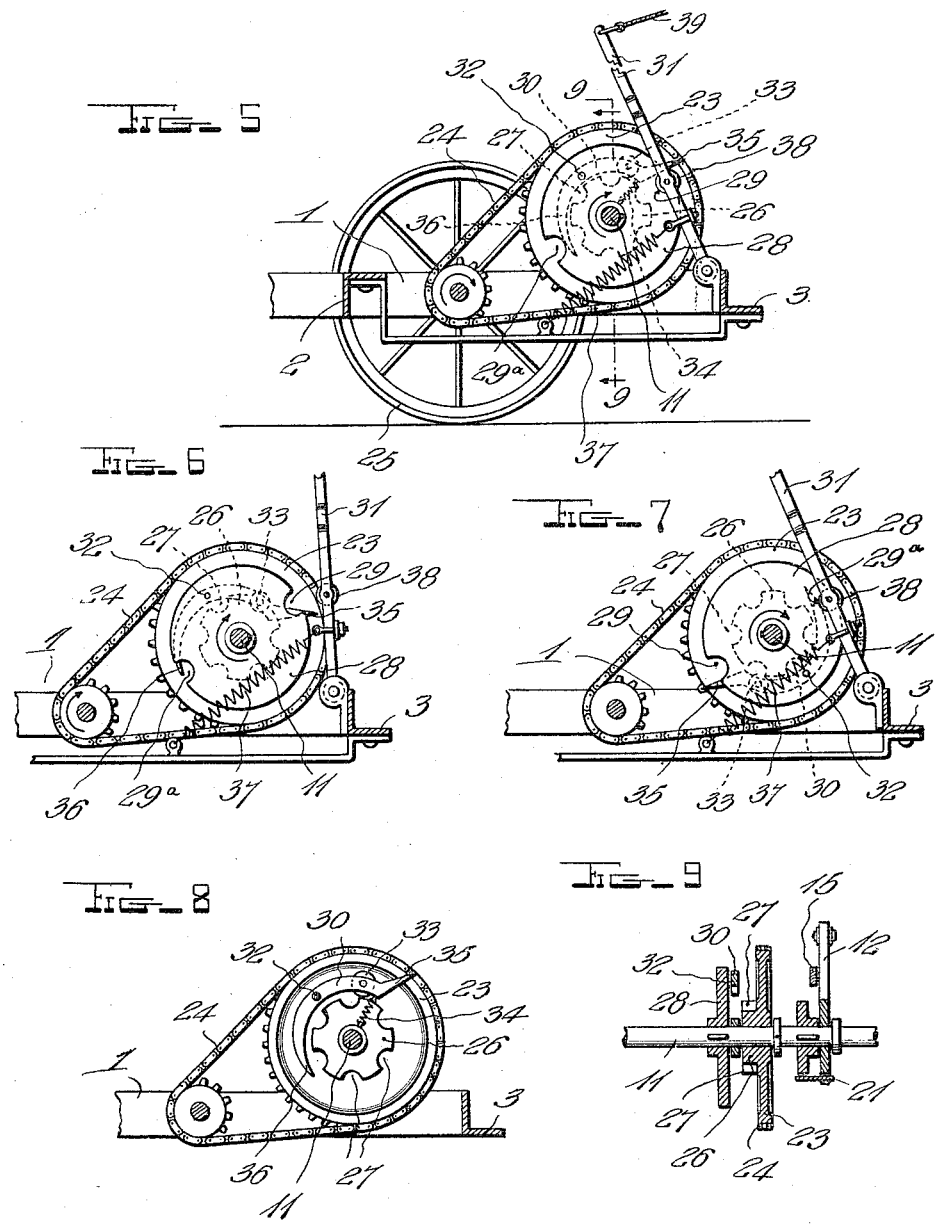

UNITED STATES PATENT OFFICE.

HALMER C. KITTELSON, OF CROOKSTON, MINNESOTA.

PLOW-RAISING MECHANISM.

1,278,939.  Specification of Letters Patent.  Patented Sept. 17, 1918.

Application filed January 26, 1917.  Serial No. 144,690.

*To all whom it may concern:*

Be it known that I, HALMER C. KITTELSON, a citizen of the United States, residing at Crookston, in the county of Polk and State of Minnesota, have invented certain new and useful Improvements in Plow-Raising Mechanism; and I do declare the following to be a full, clear, and exact description of the invention, such as will enable others skilled in the art to which it appertains to make and use the same.

My invention is an improved mechanism for successively raising and lowering the plows proper of gang plows, respectively upon completing the end of a trip across the field and upon starting another trip.

The object of the invention is to provide a mechanism of the character set forth which although being of comparatively simple and inexpensive construction, will be highly efficient and durable and will be applicable to numerous types of gang plows.

With this general object in view, the invention resides in certain novel features of construction and in unique combinations of parts to be hereinafter fully described and claimed, the descriptive matter being supplemented by the accompanying drawings wherein like reference characters designate corresponding parts throughout the several views and wherein:—

Figure 1 is a top plan view of a gang plow showing the application of my invention thereto;

Fig. 2 is a detail longitudinal section taken on the irregular line 2—2 of Fig. 1, one of the plows being shown in lowered position;

Fig. 3 is a view similar to Fig. 2 with the plow raised;

Fig. 4 is a detail longitudinal section as seen on the plane of the line 4—4 of Fig. 1;

Figs. 5, 6 and 7 are longitudinal sectional views taken approximately on the plane indicated by the line 5—5 of Fig. 1, showing the different positions of parts;

Fig. 8 is an additional longitudinal section taken on the plane of the line 8—8 of Fig. 1;

Fig. 9 is a transverse sectional view as seen on the plane of the line 9—9 of Fig. 5; and Fig. 10 is a fragmentary front elevation with parts in section.

In specifically describing the invention shown in the drawings above briefly described, similar characters will be placed on corresponding parts throughout the several views and reference will be herein made to the numerous elements by their respective indices. To this end, the numeral 1 designates the frame of a gang plow whose rear end 2 extends obliquely of its direction of travel, while its front end 3 is provided with one or more eyes 4 for the attachment of appropriate draft devices whereby the machine may be drawn forwardly by a traction engine or by other appropriate power. As is common with machines of this class, appropriate rollers 5 support the rear end of the frame 1.

Pivotally connected at their front ends to brackets 6 carried by the oblique rear end 2 of the frame 1, is a plurality of plow beams 7 to whose rear ends the plows 8 of the gang are pivotally connected by any preferred means, said plows being equipped with hand levers 9 whereby they may be adjusted in respect to the beams 7, the levers being provided with appropriate pawl and rack devices 10 for holding them in adjusted position.

As is well known to those skilled in the art to which the invention relates, it is desirable to raise the plows 8 successively upon completion of a trip across the field, and to again lower such plows in the order in which they are raised when starting upon another trip. This end, the invention accomplishes by the numerous unique features of construction now to be described.

Rotatably mounted in appropriate bearings carried by the frame 1, is a transverse horizontal shaft 11 upon which the lower ends of a plurality of plow raising arms 12 are loosely pivoted, the upper ends of said arms being attached to the front ends of appropriate connections 13, while the rear ends of the latter are attached in any preferred manner to the upper ends of posts 14 which rise from the rear ends of the beams 7. The arms 12 are equipped with auxiliary arms 15 pivoted at one end thereto at points 16 spaced above the shaft 11, the other ends of said arms being supported slidably on the upper edge of the angle-iron bar constituting the front end 3 of the frame 1, while the intermediate portions of the several arms 15 are equipped with laterally extending abutments 17 preferably in the form of rollers.

Keyed or otherwise rigidly affixed to the shaft 11 and disposed one adjacent each arm 12, is a plurality of arm actuating members 18 which are shown as of disk-like formation equipped with outstanding noses or abutments 19 for coöperation with the abutments 17 to move the arms 12 forwardly for the purpose of raising the plows, when the shaft 11 is rotated a half revolution by means yet to be described. After the arms 12 have been so moved as to raise the plows, they are locked against further movement by the enagement of noses 20 on their lower ends with locking devices in the form of flat springs 21 which are secured to the front end bar of the frame 1 as shown clearly in Figs. 2, 3 and 4. In addition to the noses 20, other noses 22 are formed on the lower ends of the arms 12 to limit the movement of said arms when lowering the plows. Obviously, due to the arrangement of parts shown, when the arms are moved from their inactive positions shown in Fig. 2, to that depicted in Fig. 3, the noses 20 will depress the springs 21 while traveling thereover, but the moment said noses leave the ends of the springs, the latter will spring upwardly thus causing said noses to abut their free ends, thereby preventing retrograde movement of the arms 12, this being expedient, since it is at this time that the abutments 17 are disengaged by the abutments 19, all of which will be hereinafter more clearly and definitely pointed out.

In order to raise the plows by the mechanism above described, it is necessary to rotate the shaft a half revolution, whereas if said shaft be rotated a second half revolution, the plows will be lowered. It is thus necessary to provide simple yet efficient means for allowing the shaft in question to be moved in the manner set forth at the will of the operator. In accomplishing this end, a gear 23 is mounted loosely upon the shaft 11, preferably at the center thereof, and is driven constantly by a sprocket chain 24 from a ground wheel 25 which supplements the rollers 5, and a combined clutch and stop mechanism is employed which allows motion to be transmitted from the gear 23 to the shaft 11 when necessary, such mechanism also serving to prevent rotation of the shaft when the plows are to remain in lowered position.

The mechanism just mentioned comprises briefly a hub 26 on the gear 23 having a plurality of peripheral notches 27, a disk 28 secured to the shaft 11 adjacent said hub and having two notches 29 and 29ª formed in its periphery at diametrically opposite points, a connecting lever 30 for locking the hub and disk together, and an operating lever 31 for controlling the movement of said lever 30 and for normally holding the disk 28 against movement. The lever 30 is curved throughout its length and is fulcrumed at 32 to the disk 28 at a point preferably disposed centrally between the two notches 29 and 29ª, one end of said lever being equipped with a lateral projection 33 here shown in the form of a roller, such projection being adapted to be received in the notches 27 of the hub 26 when a spring 34 is allowed to rock the lever 30. However, the spring 34 is normally held under tension and the projection 33 is thus held disengaged from the notches 27, this end being accomplished by the features of construction now to be explained.

The end of the lever 30 carrying the projection 33, is equipped with a cam 35 of such a length as to project beyond the periphery of the disk 28, said cam being disposed at the notch 29 for reasons yet to appear. The other end 36 of the lever 30 is located at the notch 29ª as clearly shown in several of the views.

The operating lever 31 stands normally upright and is rocked rearwardly by an appropriate spring or the like 37, said lever being provided with a laterally extending stop 38 preferably in the form of a roller, which stop is adapted to be received first in the notch 29 and then in the notch 29ª, or vice versa, as the shaft 11 is rotated in a half revolution to raise the plows and another half to lower the same.

Assuming that the parts of the shaft turning and stop mechanism normally stand as shown in Fig. 5, the projection 33 will be disengaged from the notches 27 and the stop 38 will be disposed in the notch 29. Thus, the driving gear 23 may rotate idly upon the shaft 11 without turning the latter, but when the operator desires to raise the plows, he will pull the lever 31 forwardly by the use of an appropriate cable or the like 39, thus moving the stop 28 out of contact with the cam 35 which it normally engages, the result being that the spring 34 will immediately rock the connecting lever 30 to engage its projection 33 with one of the notches 27. This causes the gear 23 to impart its motion on the shaft 11, whereupon the abutments 19 which are suitably spaced on the shaft 11 for this purpose, are moved successively into contact with their respective abutments 17 on the arms 15. Thus, the arms 12 will be moved forwardly and the plows will be successively raised. All of this takes place while the shaft 11 is rotating one half revolution, and the moment it has moved this amount, the notch 29ª is so disposed as to allow the spring 37 to again rock the operating lever 31 rearwardly to dispose its stop 38 in said notch. While this takes place, the end 36 of the connecting lever 30 is positioned in the notch 29ª as shown in Fig. 6, the result therefore being that said end 36 will be struck by the stop 38, thereby rocking the lever 30 around its fulcrum and disengaging its projection 33 from the notches 27 in the hub of the driving gear 26. This again disconnects said gear from the shaft and the plows will be held in raised position by the locking springs 21 which have in the mean time operated in the manner above defined. When it is again necessary to lower the plows, the operator again pulls forwardly on the cable 39, whereupon the spring 34 will reëngage the projection 33 with one of the notches 27. This reëstablishes connection between the gear 23 and the shaft 11 to rotate the latter throughout another half revolution. This movement, brings the abutments 19 successively into contact with the locking springs 21 and releases said springs from contact with the noses 20 on the arms 12, thereby allowing the weight of the plows to move said arms to their inactive positions, this movement being limited by the stop noses 22. It is obvious that due to the circumferentially spaced relation of the abutments 19, they will not only successively raise the plows, but will release the locking device 21 to lower said plows in the same order in which they have been raised.

While the half revolution of the shaft 11 which lowers the plows has taken place, the cam 35 is so located in respect to the notch 29 in the disk 28, (see Fig. 7) as to engage the stop 38 and again rock the lever 30 to inactive position, simultaneously with the reception of said stop on the notch 29.

From the foregoing description, taken in connection with the accompanying drawings, it will be obvious that although comparatively simple and inexpensive construction has been provided for the attainment of the desired end, the machine will be highly efficient and durable and will possess a number of advantageous characteristics. Particular emphasis is laid upon the few parts required in carrying out the object of the invention, as well as upon the unique construction and functions of such parts. The elements shown, are for numerous reasons preferable, but it is manifest that I may make numerous changes within the scope of the invention as claimed, without sacrificing the primary advantages thereof.

I claim:—

1. In a mechanical raising mechanism for gang plows, a shaft and means to rotate the same at will, a plurality of plow raising and lowering arms loosely pivoted on said shaft, arm actuating members secured to said shaft, auxiliary arms pivoted to said first named arms at points spaced from the shaft, coöperating abutments on said auxiliary arms and said members whereby to move said first named arms to raise the plows, when the shaft is rotated a predetermined amount, means for rocking said auxiliary arms to disengage said abutments after so moving said first named arms, and means for locking said first named arms against movement simultaneously with the disengagement of said abutments.

2. In a mechanical raising mechanism for gang plows, a shaft and means for rotating the same at will, a plurality of plow raising and lowering arms loosely mounted on said shaft, arm actuating members secured to said shaft, auxiliary arms pivoted at one end of said first named arms at points spaced from the shaft, each of said auxiliary arms having an abutment between its ends, a trip bar upon which the free ends of said auxiliary arms rest slidably, and additional abutments on said arm actuating members for contact with the aforesaid abutments to shift the auxiliary arms, thus moving the first named arms to raise the plows and also sliding said auxiliary arms on the trip bar to cause the abutments on said links and members to disengage.

3. In a mechanical raising mechanism for gang plows, a shaft and means to rotate the same at will, a plurality of arms loosely pivoted on said shaft and adapted to be moved in one direction to raise a gang of plows, noses on said arms and locks coacting with said noses for holding said arms after they are moved to raise the plows and combined arm actuating and lock releasing members secured to said shaft for moving said arms to raise the plows upon revolution of said shaft a predetermined amount, and for releasing the locks from engagement with said noses upon further revolution of said shaft, whereby to lower said plows.

4. In a mechanical raising mechanism for gang plows, a shaft and means to rotate the same at will, a plurality of arms loosely pivoted on said shaft and adapted to be moved in one direction to raise the gang of plows, noses on the pivoted ends of said arms, fixed springs with which said noses coöperate to lock the arms when the latter have been so moved as to raise the plows, and arm actuating members secured on the shaft for moving said arms to operative position upon rotation of said shaft a predetermined amount, said members having abutments thereon for contact with the springs to release the latter upon further rotation of said shaft.

5. In a raising mechanism for gang plows, the combination of a frame including a horizontal transverse bar, a horizontal transverse shaft rotatably mounted on said frame and spaced to one side of said bar, means for rotating said shaft at will, a plurality of plow raising and lowering arms having their lower ends pivoted loosely on said shaft, a plurality of disk-like operating members secured to said shaft and disposed one adjacent each arm, inclined auxiliary arms pivoted at their upper ends to said first named arms at points spaced above said shaft, the lower ends of said auxiliary arms being supported slidably on the aforesaid bar, coöperating abutments on said arm actuating members and said auxiliary arms, noses formed on said first named arms, and flat springs secured to the frame for coöperation with said noses, said springs being positioned in the path of movement of the abutments on said operating members, whereby said abutments may release said springs.

In testimony whereof I have hereunto set my hand in presence of two subscribing witnesses.

HALMER C. KITTELSON.

Witnesses:
W. P. STONE,
L. M. STONE.

Copies of this patent may be obtained for five cents each, by addressing the "Commissioner of Patents, Washington, D. C."